March 4, 1924.   E. GRUENFELDT   1,485,459
ARC WELDING
Filed Feb. 13, 1922
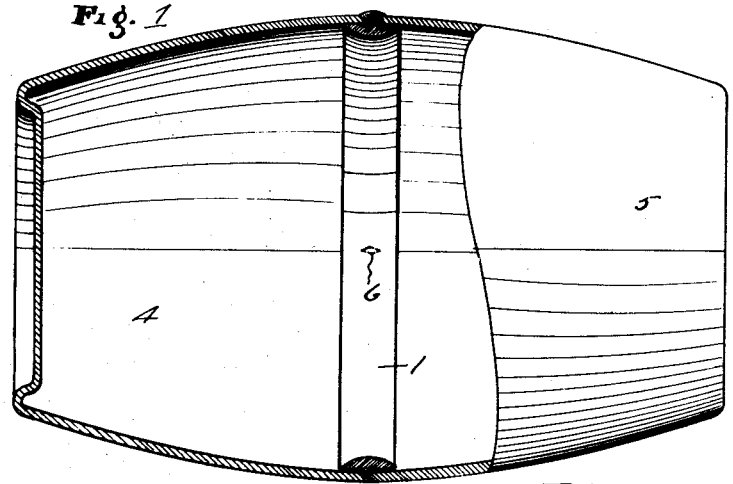
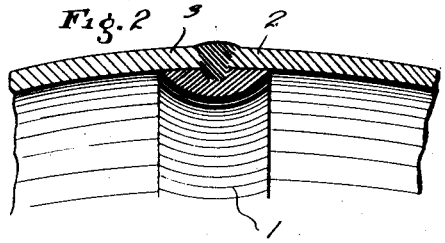
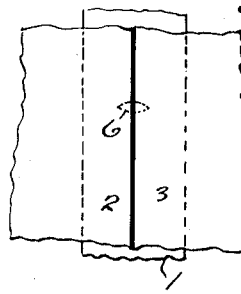
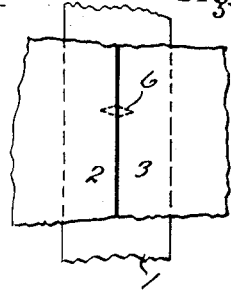
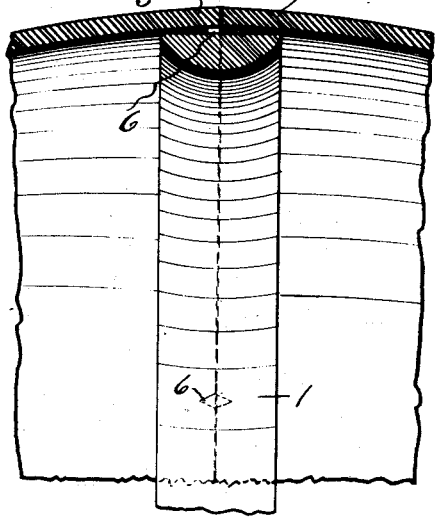
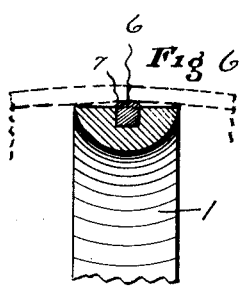
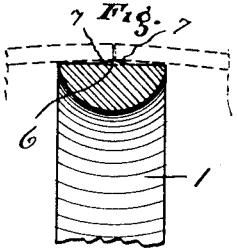

Patented Mar. 4, 1924.

1,485,459

UNITED STATES PATENT OFFICE.

EMIL GRUENFELDT, OF CLEVELAND, OHIO, ASSIGNOR TO THE HYDRAULIC STEEL COMPANY, OF CLEVELAND, OHIO, A CORPORATION OF OHIO.

ARC WELDING.

Application filed February 13, 1922. Serial No. 536,236.

*To all whom it may concern:*

Be it known that I, EMIL GRUENFELDT, a citizen of the United States, residing at Cleveland, in the county of Cuyahoga and State of Ohio, have invented a certain new and useful Improvement in Arc Welding, of which the following is a full, clear, and exact description, reference being had to the accompanying drawings.

This invention relates to joining sheet metal parts by arc welding.

It is an object of this invention to enable relatively thin sheet metal parts to be readily joined by arc welding, the joint to be strong and not having an unsightly ridge.

A further object of this invention is to provide a backing member having guiding projections which will properly position the metal parts to be joined relative to each other and to the backing member for welding purposes.

Another object of this invention is to have guiding projections on the backing member so designed to permit two metal tubs to be forced together over the backing member and over the projections to provide a seam with the edges of the tubs practically in contact and substantially over the middle of the backing bar.

Another object of the invention is to provide an assembly for arc welding in which an electric current of relatively high voltage and power is used, so that it will penetrate and quickly melt to a considerable depth the substantially contacting edges of the tubs and backing bar before materially heating the metal adjacent the joint.

In the drawings forming a part of this specification,

Figure 1 is a view partly in section showing a barrel with the welded joint.

Fig. 2 is an enlarged section showing the joint after the tubs have been welded to the reinforcing ring.

Fig. 3 is an enlarged section showing the tubs overlying a projection of the backing bar and ready to be welded.

Figs. 4 and 5 show plan views with differently shaped projections on the backing bar.

Figs. 6 and 7 are sectional views showing modifications of the shape of the projections and their relation to the backing ring.

In applying my invention to the joining of barrel tubs for example, a reinforcing ring 1 is sized to fit snugly in the edge portions 2 and 3 of the tubs 4 and 5. The ring 1 is provided with a plurality of projections 6 and these projections preferably have their greatest dimension transversely of the ring. They may be made with their highest point at the center and sloping as at 7 in both directions away from the center, so that when the tubs are forced together over these rings their edges will be deflected outwardly at the relatively few points where the projections 6 occur on the ring.

In the form shown in Fig. 3 the projections 6 present a knife edge to the base of the tubs which cuts into the tub and displaces a small amount of metal and does not cause the tub to rise as much as when these surfaces are inclined as in Figs. 6 and 7.

In both of these forms the ring 6 is not attached to either tub but the tubs are merely pressed onto the ring axially and the projections 6 cause the tubs to come together so that the line of contact substantially overlies the middle of the ring circumferentially and is substantially in contact with the ring throughout its periphery. This assembly is a desirable one for arc welding, particularly when an electric current of relatively high voltage and amperage is available. Such a current will quickly fuse the edges of the tubs and part of the backing ring, without injuriously heating any substantial area of the metal adjacent the fused joint. The intense heat of the arc will be sufficient to easily melt the projections 6 so that the backing ring and edges will be homogeneously united and the joint filled flush with the upper surface of the sheet metal parts.

The use of an electric current of high power which will quickly fuse the parts enables the operator to weld at a speed much greater than can be obtained where a lower powered current is used and more electrode metal must be fused and deposited in the channel to form the joint and finish it flush with the sheet metal parts to be joined. The backing ring is made relatively thick so that the edges of the metal may be thoroughly fused and united with a part of the backing ring without melting thru the ring.

The spacing projections can be designed and provided to best position or space the tubs so that they are best suited for the character of electric current applied in the welding operation.

The projections 6 may be either hot rolled into the strips from which the backing rings are formed, or the strips may have recesses formed in them and pins set down in the strips, or the projections may be formed in any other suitable manner. In case one does not desire to use a metallic electrode, a carbon electrode can be used, in which case additional metal to be fused can be added in any suitable form, such as a wire, rod, pieces, etc.

What I claim is:

1. A joint produced by arc welding comprising a backing bar having a plurality of projections, a pair of sheet metal members overlying said backing bar and projections, the edges of said sheet metal parts being secured to said bar by fusion of said edges, said projections and said bar.

2. A joint produced by arc welding comprising an annular backing bar having a plurality of centering projections, tubs positioned with their opposed edges in contact and overlying the backing bar and its projections, said tub edges, projections and backing bar being fused together.

3. An assembly for arc welding comprising an annular backing bar carrying centering projections, and sheet metal tubs resting on said bar with their edges substantially in contact and overlying said bar, said projections serving to hold the tub edges substantially over the middle point of the peripheral face of the backing bar.

4. An assembly for arc welding comprising an annular backing bar having centering projections, and tubs positioned with their edges opposed and overlying said bar and projections.

5. The herein described method of joining sheet metal tubs which comprises positioning the edges of the tubs substantially over the middle of a backing bar, said bar having projections to frictionally hold the tubs in place for welding, and directing an arc against the opposed tub edges to fuse them together and to unite them to the backing bar.

6. The herein described method of joining sheet metal tubs which consists in pressing them together over an annular backing bar carrying projections, said projections causing the edges of the tubs to frictionally engage the bar and come together substantially in contact centrally of the peripheral face of said bar, and directing an arc against said edges to unite the edges, projections and bar by fusion.

7. A barrel comprising a central reinforcing ring having a cylindrical face, a plurality of relatively low projections on said face, a pair of tubs having their edges fitting against the face of the ring and frictionally held in place by said projections, said edges, projections and bar being fused together.

In testimony whereof, I hereunto affix my signature.

EMIL GRUENFELDT.